Patented Aug. 26, 1924.

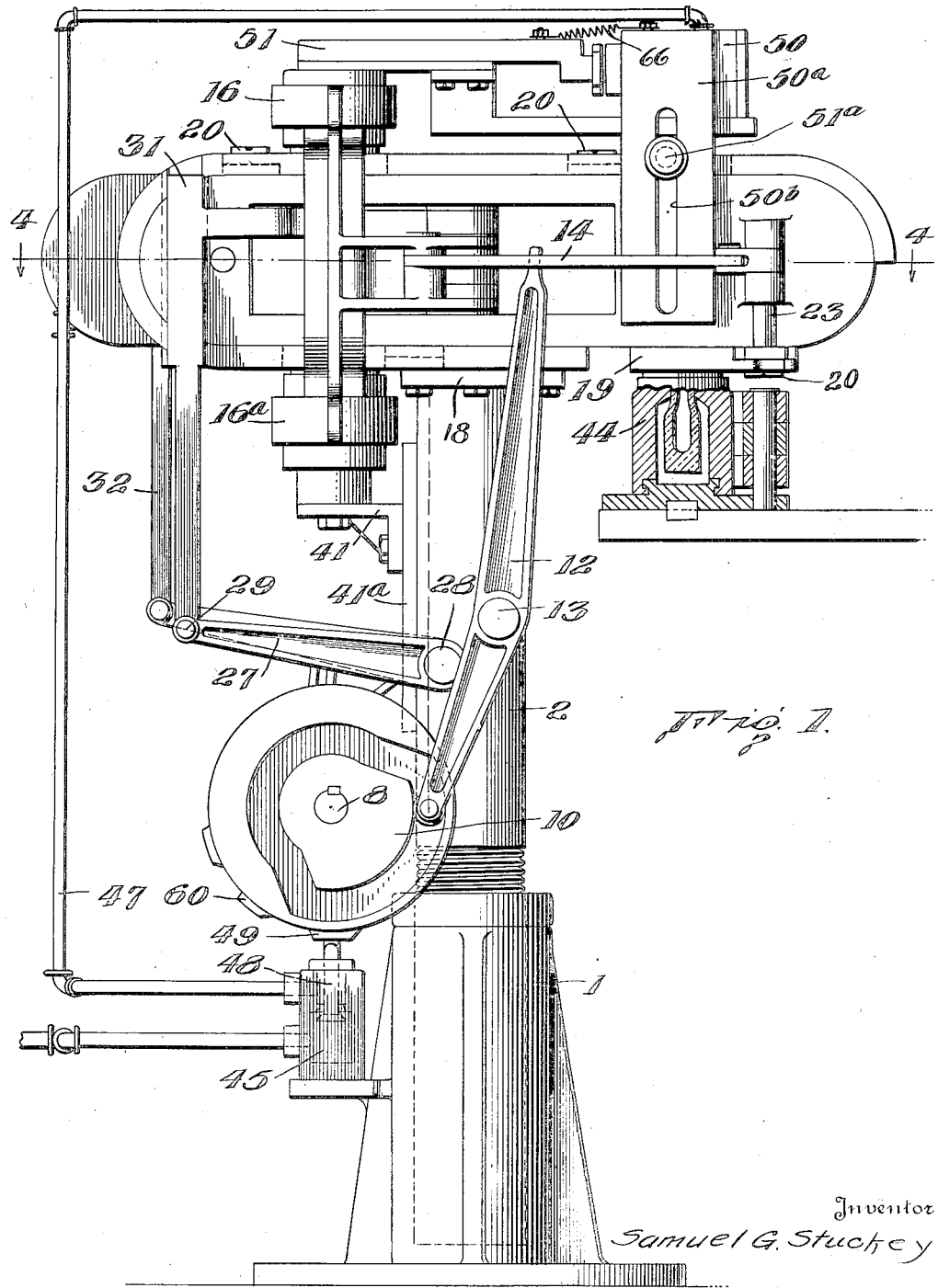

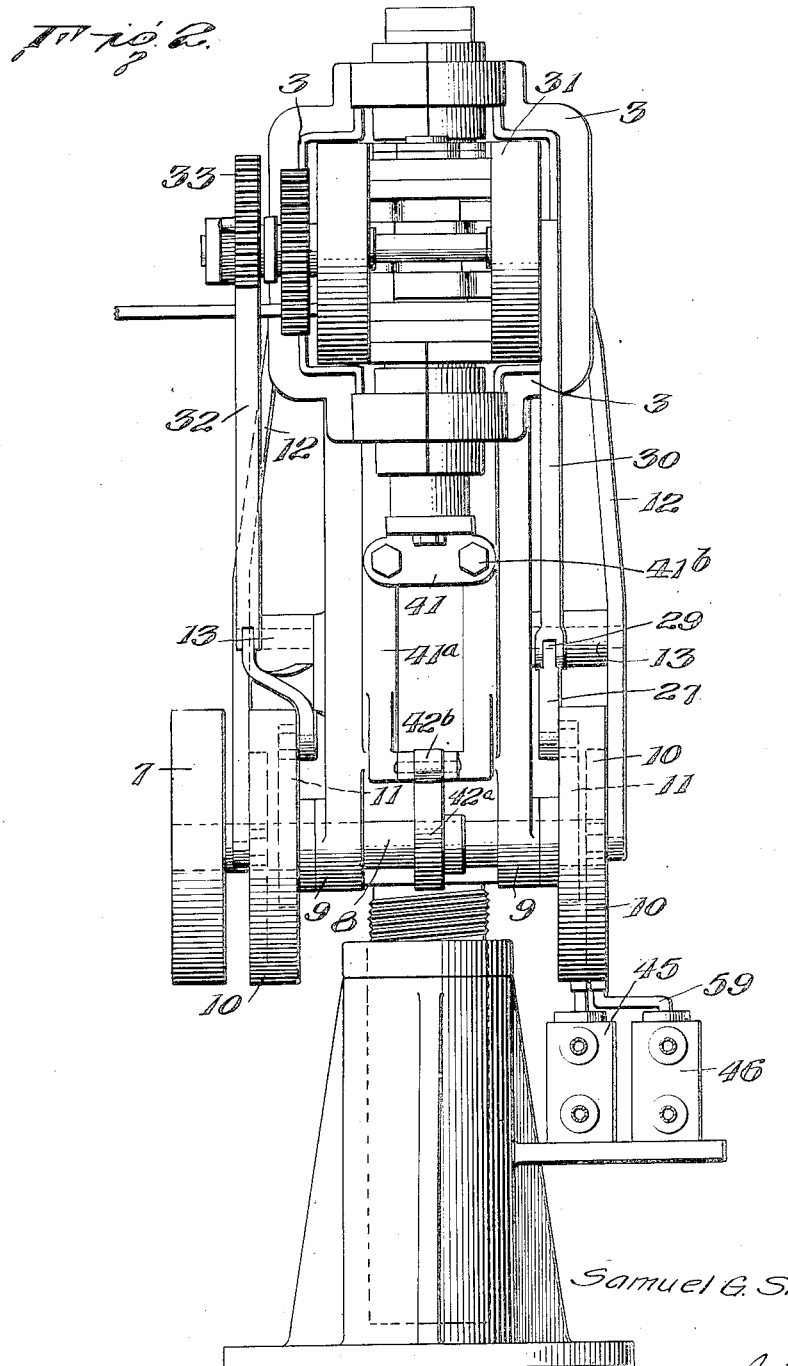

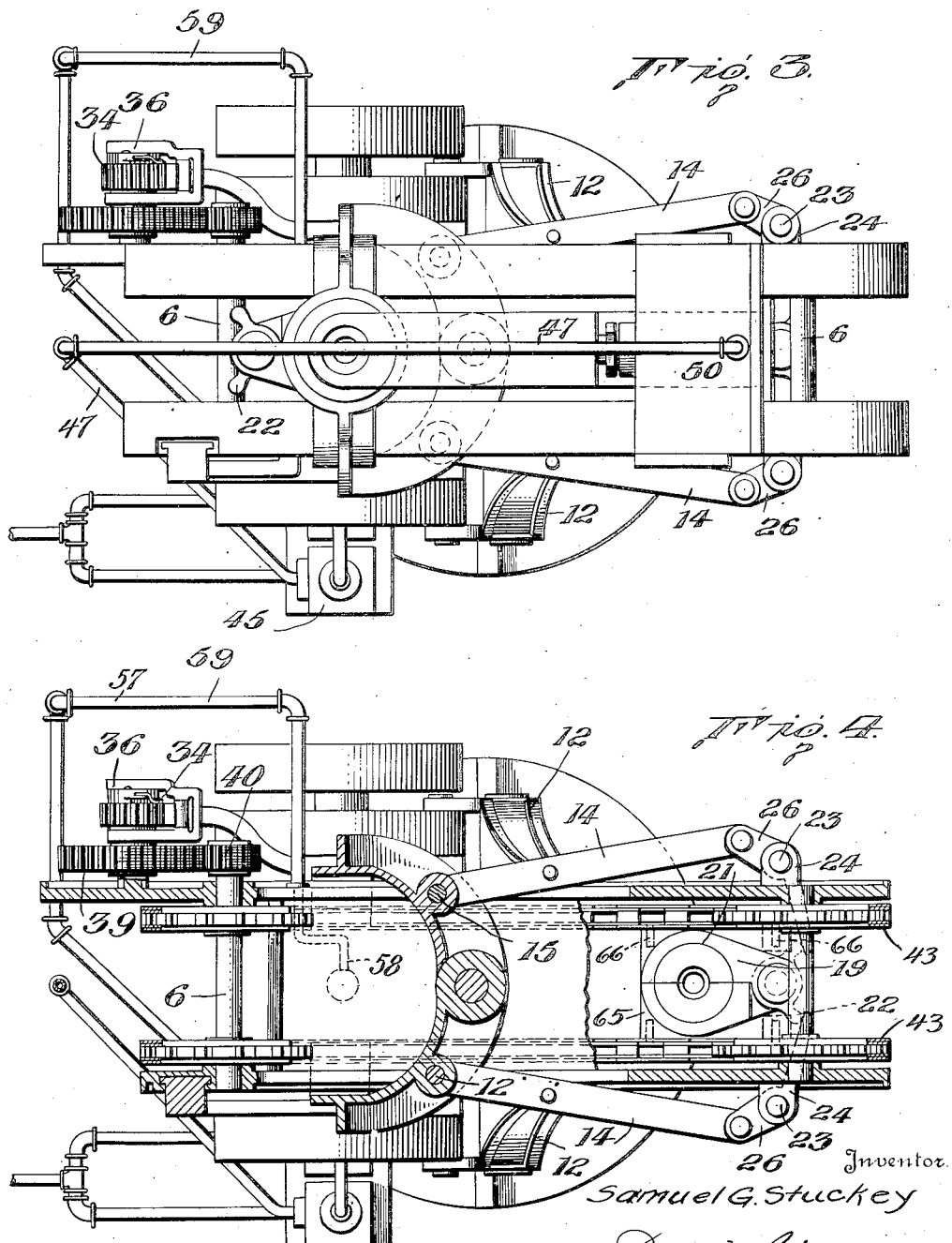

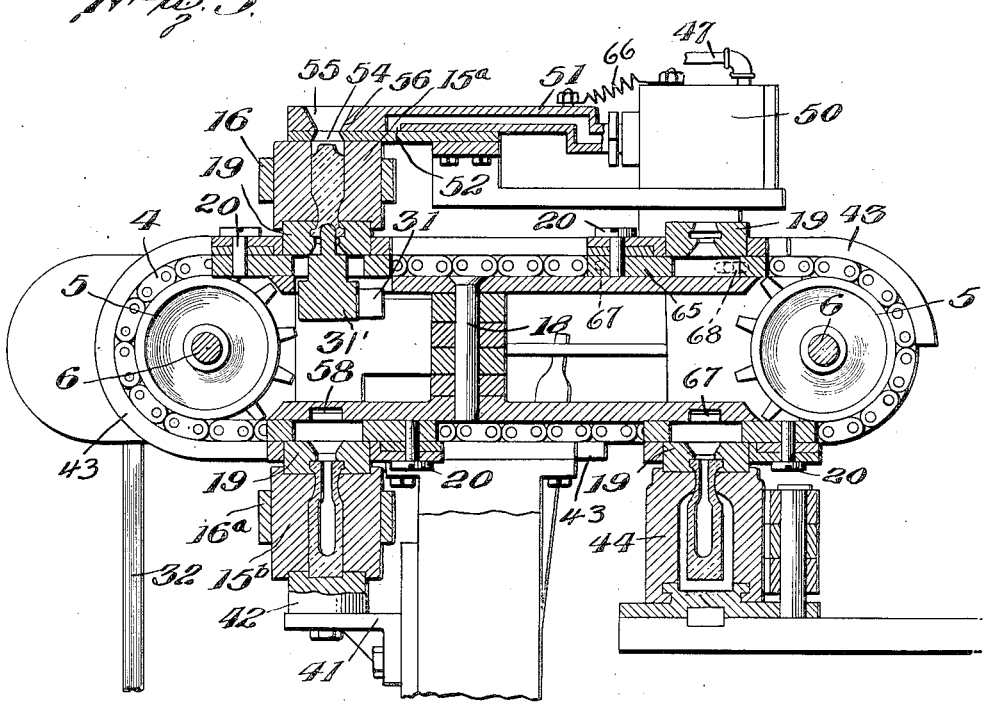
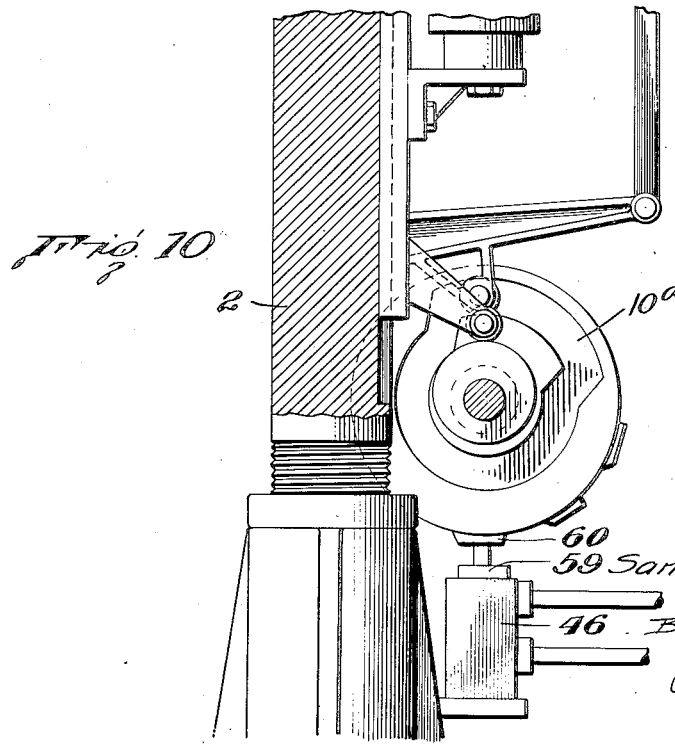

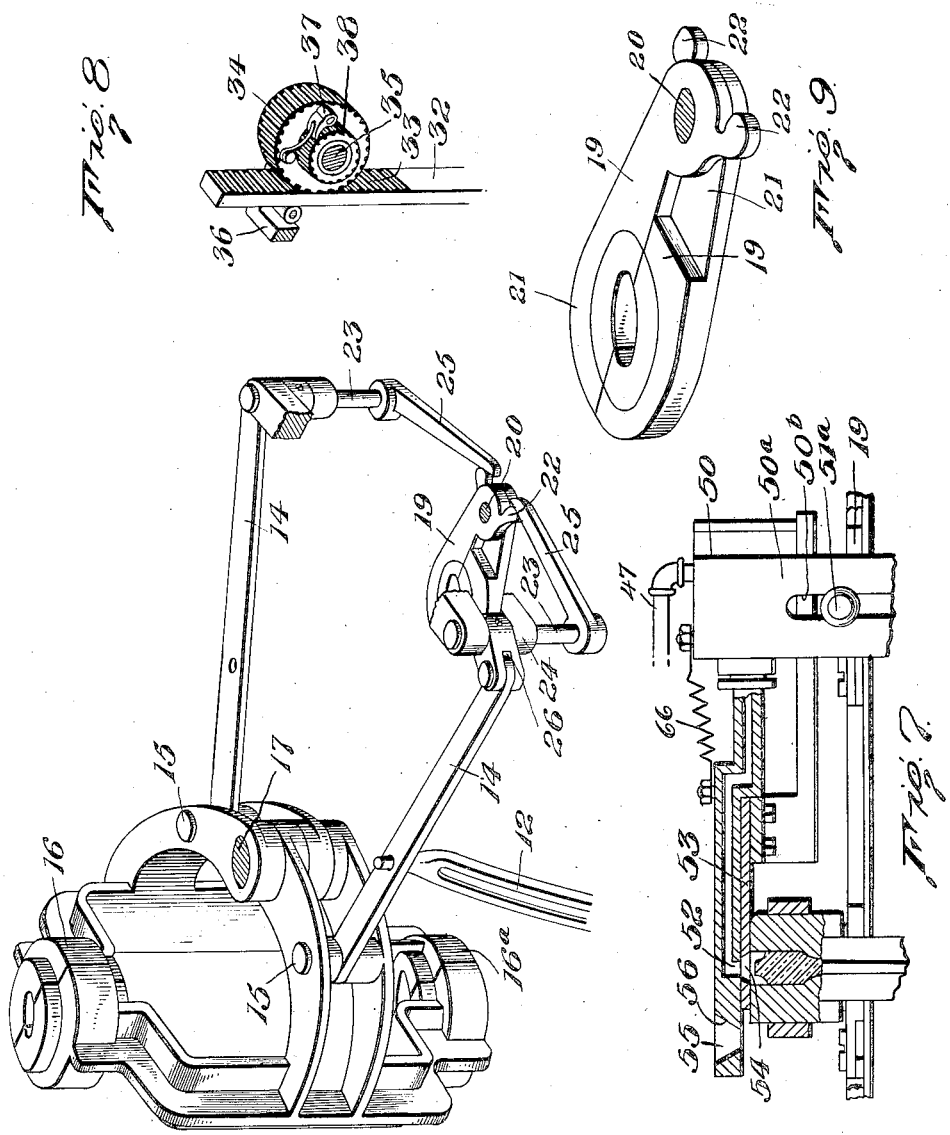

1,506,687

UNITED STATES PATENT OFFICE.

SAMUEL G. STUCKEY, OF WARREN, PENNSYLVANIA.

BOTTLE-MAKING MACHINE.

Application filed July 20, 1920. Serial No. 397,710.

*To all whom it may concern:*

Be it known that I, SAMUEL G. STUCKEY, a citizen of the United States, residing at Warren, in the county of Warren and State of Pennsylvania, have invented new and useful Improvements in Bottle-Making Machines, of which the following is a specification.

This invention relates generally to bottle-making machines and particularly to bottle blank-forming machines.

It has been customary heretofore in forming bottle blanks to fill a mold with the molten glass, shear off the glass, admit air pressure to force the glass into the neck mold through the usual "blowdown head", remove the "blowdown head", place a baffle head in position in the mold and admit air pressure to the reverse end of the mold, thereby completing the blank. As this operation is carried out in one mold, it is necessary, in order to secure production, that the mold be moved from its filling position and the subsequent operations carried on at some other point. In accordance with the usual practice, at least five blank molds and five finishing molds are provided for this operation, the molds being carried on a rotatable table.

The objects of the present invention are to provide a relatively inexpensive automatic apparatus having means whereby the bottle blank is removed from the forming mold before it is finished and transferred to another mold for finishing, to provide a machine of the type set forth which shall consist of relatively few parts, which shall not be subject to derangement of parts and which may be readily adapted to form bottle blanks of various sizes.

With the above and further objects in view my invention consists in certain features of structure, combination and relation which will be more fully set forth hereinafter.

I have illustrated one embodiment of my present invention in the accompanying drawings, wherein:—

Figure 1 is a side elevation, partly in section, of a machine constructed in accordance with my invention.

Figure 2 is an end elevation.

Figure 3 is a top plan view of the machine.

Figure 4 is a horizontal section taken on lines 4—4 of Figure 1.

Figure 5 is a vertical section through the machine.

Figure 6 is a perspective view of the forming molds and operating means therefor.

Figure 7 is a vertical section through the glass feeding and shearing mechanism.

Figure 8 is a detail of the rack, pinion and ratchet transmission.

Figure 9 is a perspective view of one of the neck molds.

Figure 10 is a detail view partly in section showing the arrangement of the cams.

Referring to the drawings, wherein similar numerals denote like parts throughout the several views:

The machine as embodied in the drawings includes a base 1 which supports, by means of a suitable standard 2, a casing 3. Within this casing an endless chain conveyor 4 is mounted on the sprockets 5 carried by shafts 6 journaled in the side walls of the casing.

A pulley 7 which is adapted to be driven by any suitable power means is mounted on a shaft 8 which is journaled in brackets 9 affixed to the standard 2. Pairs of cams 10 and 11 are splined to shaft 8 on opposite sides of the standard 2. The cams 10 actuate the levers 12 which are pivoted at points 13 to opposite sides of the standard and are connected at their upper ends to the mold operating rods 14. The mold operating rods 14 are pivotally connected, as at 15, to the two-part mold carrying members 16 and 16ᵃ which are disposed in vertical alinement adjacent one end of the conveyor. The mold members 16 and 16ᵃ are hinged at 17 and are supported by a suitable bracket 18 secured to the standard 2 and carry molds 15ᵃ and 15ᵇ which may be of any suitable size dependent upon the size of bottle to be formed.

A plurality of neck molds 19 are carried by the conveyor. These neck molds are similar in design and are each pinned, as at 20, to a plate 65 carried between the conveyer chains and suitably connected thereto, as for instance, by inward extensions 66 of certain of the chain link pivots, one pair of which extensions fit into sockets 67 on opposite sides of the plate adjacent one end thereof, the other pair playing in longitudinal slots 68 adjacent the other end of the plate, providing lost motion between the chain and plate whereby the latter is able to assume the relation of a chord with respect to the sprocket wheels when the chain is passing therearound. Each neck mold as shown in Figure 9 comprises two sections 21 each forming half of the mold and which are formed with projecting operating fingers 22. A pair of vertical shafts 23 are mounted in suitable bosses 24 on opposite sides of the casing and at the opposite end of the conveyor from the mold members and fixed to these shafts and adapted to oscillate therewith are the neck mold operating arms 25. These vertical shafts 23 are actuated from the levers 14 through means of crank arms 26 pivoted thereto.

The cam 11 which is mounted adjacent the standard operates a lever 27 which is pivoted to one side of the standard, as at 28. This lever is pivoted, as at 29, to a vertically disposed link 30 and is connected at its upper end to a sliding member 31 which carries a plunger or neck former 31'.

The conveyor is actuated through means of a cam 10$^a$ cooperating with vertical shaft 32 which is formed at its upper end as a rack, as at 33. Operatively associated with this rack 33 is a pinion 34 loosely mounted on a shaft 35 journaled in a bracket 36 suitably secured to the casing of the machine. (See Figure 8). The pinion 34 is provided with a spring-pressed pawl 37 through means of which it drives a pinion 38 keyed to shaft 35. The shaft 35 also carries a pinion 39 which is in mesh with a driven pinion 40 keyed to the shaft 6 which carries the conveyor sprockets 5.

Mounted on a suitable bracket 41 adjustably secured to a vertically movable member 41$^a$ and positioned below and in contact with the lower mold member 16$^a$ is a baffle head 42 which serves the usual function of closing the bottom of the mold member. This baffle head is placed in position and withdrawn through means of a cam 42$^a$ which acts on a roller 42$^b$ carried by vertical member 41$^a$. The cam 42$^a$ is so formed and arranged that the baffle head is withdrawn simultaneously with the opening of the lower mold member and replaced in position when that mold member is again closed. In order to accommodate the baffle head to molds of various sizes the baffle head bracket is vertically adjustable on the member 41$^a$ by means of set screws 41$^b$.

The apparatus further comprises a pair of cam strips 43 which are secured to the casing of the machine adjacent the conveyor flight and terminate near the finishing mold 44. The function of the cam strip is to contact with the sections 21 of the neck molds as they are carried along on the conveyor and thereby to maintain the neck molds in closed position until they come to position above the finishing mold where they open.

The air pressure organization of the machine comprises the following: two compressed air reservoirs 45 and 46 which are fed from any suitable source of supply (not shown). The reservoir 45 communicates with a pipe 47, the admission of air to which is controlled through means of the puppet valve 48 which is actuated by a cam 49 which is integral with the cam member 10. Air under pressure is admitted from the pipe 47 to a reservoir 50 positioned at the top of the machine. This reservoir 50 is in communication with a sliding air conduit 51 which is formed with an opening 52. This conduit is mounted for reciprocating movement on a plate 53 which is superimposed on the upper mold member 16 and which has an opening 54 which registers with the opening in the mold. The conduit 51 is formed with a funnel-shaped feed opening 55. It is apparent that when the device is in the position indicated in Figure 5 of the drawing molten glass may be fed to the upper mold. Upon the admission of compressed air to the reservoir 50 through the pipe 47 the sliding conduit 51 will move in a piston-like fashion upon plate 53 until the opening 52 in the conduit is in registry with the opening 54 in the plate (as shown in Figure 7), whereupon the air will be admitted to the mold to force the molten glass into the neck mold. The sliding conduit is retracted to original position by the spring 66. In this operation just prior to the admission of the compressed air to the mold the glass is sheared off by action of the beveled face 56 of the feed opening. The air reservoir 50 and sliding conduit 51 are carried by a bracket 50$^a$ having a vertically extending slot 50$^b$ cooperating with a set screw 51$^a$ threading into the side casing of the apparatus whereby the shearing device may be elevated or lowered in order to accommodate molds of different sizes. Compressed air is admitted to the lower mold member 15$^b$ which functions as the blow mold from air reservoir 46 and the air line 57 through a conduit 58. The admission of compressed air to this line is controlled through means of a puppet valve 59 actuated by a cam 60, which is also integral with the cam member 10.

In the operation of my device molten glass is poured into the feed opening 55. By the time this operation has been completed the cam 49 actuates puppet valve 48 admitting compressed air to the reservoir 50 through the air line 47, whereupon the conduit 51 will slide over, shearing off the glass, and placing its discharge opening 52 in registry with the opening 54 in the plate 53. Compressed air will then be admitted to force the molten glass down upon the neck mold. When the cam 49 ceases to engage the puppet valve 48 the flow of compressed air ceases and the former 31' is withdrawn from position in the neck mold 19, as hereinbefore discussed. The shaft 35 through the medium of its ratchet and pawl then actuates the conveyor and at the same time the operating arm 12 is oscillated which opens the molds 15ª and 15ᵇ, permitting the blank to be carried by the neck mold into the lower mold member 15ᵇ whereupon the lever 12 closes the molds and air pressure is admitted to the air line 57 and conduit 58, whence it enters the lower mold and blows the blank to the required form. During this operation it will be understood that the first operation just discussed is being carried on simultaneously in the upper mold. Further running of the apparatus again opens the molds, whereupon the rod 32 again actuates the conveyu system to carry the lower neck mold into position above the finishing mold where air is blown into the blank by means similar to that by which air is admitted to the blow mold. At this point when the molds are again opened the operating rod 14 through means of the vertical shaft 23 and neck mold opening arms 25 opens the neck mold and releases the blown bottle blank to the finishing mold, whence it may be removed. In the further operation of the machine the neck mold is then carried around to the upper part of the conveyor where the fingers 22 come in contact with the cam strips 43 and the neck mold is closed, in which position it next takes its place below the upper mold 15ª.

It is apparent that by vertical adjustment of the air reservoir 50 and conduit 51 through means of set screw 51ª, molds of various heights may be accommodated within the upper mold-carrying member 16. By vertical adjustment, the baffle head 42 is readily accommodated to the various sizes of molds.

I claim:—

1. In a bottle blank-forming machine, a parison mold and neck former, cooperatively arranged, a blow mold, an endless conveyer belt passing between said parison mold and neck former, and travelling to said blow mold, a plurality of neck molds carried by said conveyer belt, means for actuating said conveyer belt to move said neck molds successively into registry with said parison mold and neck former, and with said blow mold, and means for simultaneously opening said parison and blow molds.

2. In a bottle blank-forming machine, a series of two-part mold members comprising parison, blow and finishing molds, means for simultaneously opening and closing said mold members, a neck former operatively associated with said parison mold, a conveyer belt arranged to travel between said parison mold and neck former and in operative proximity to said blow and finishing molds, a plurality of neck molds carried by said conveyer belt and acting as transfer agents whereby the parison is carried successively from said parison mold and neck former to said blow mold and finishing mold, and means for imparting intermittent movement to said conveyer, timed to hold the neck molds in operative position with respect to said mold members.

3. In a bottle blank-forming machine, a parison mold and a blow mold, a neck former mounted in a vertical alignment with, and closing one end of said parison mold, a baffle head associated with said blow mold and closing one end thereof, a conveyer belt arranged between said parison mold and neck former and travelling from the parison mold to the blow mold, a plurality of neck molds secured in spaced relation on said conveyer belt, plate members positioned adjacent the other ends respectively of said parison and blow molds, means for admitting fluid under pressure through said plates into said molds, the one of said plates associated with said parison mold being formed with a filling opening having a shearing edge, and means to move said plate to alternately place the filling opening and the fluid pressure supply in communication with the chamber of said parison mold.

4. In a bottle blank-forming machine, an endless conveyor, a two-part neck mold fixed to said conveyor, means operating upon the flight of said conveyor to close said neck mold, a parison mold in adjacency to said conveyor, means operating upon said conveyor to position said neck mold in registry with said filling mold, a neck former and automatically operating means for inserting said former in said neck mold when the neck mold is in registry with the parison mold, means for supplying compressed air to said parison mold, a blow mold adjacent said conveyor, means for opening and closing said parison mold and said blow mold, means for supplying compressed air to said blow mold, a finishing mold adjacent said conveyor, means operating upon said conveyor to position said neck mold in registry with said finishing mold, and means operating upon opening of said parison and said blow molds to open the neck mold when in registry with said finishing mold.

5. In a bottle blank-forming machine in combination with a parison mold, a blow mold and a finishing mold, means for conveying the bottle blank from said parison mold to said blow mold and said finishing mold, means for shearing off molten glass after the parison mold has been filled, means for admitting compressed air to said parison mold, said means including a vertically adjustable reservoir and a sliding air conduit having an air outlet opening adapted to register with said parison mold.

6. In a bottle blank forming machine, a parison mold and a blow mold, an endless conveyer operating between said mold members, a plurality of two part neck molds pivoted to said conveyer, said neck molds being formed with fingered extensions, means engaging said fingered extensions to successively open each of said neck molds at a point in its travel beyond the blow mold, means for opening said parison and blow molds simultaneously with the opening of each neck mold and means for successively closing said neck molds and holding them closed while travelling from the parison mold to the aforesaid point in their travel beyond the blow mold.

7. In a bottle blank forming machine, a casing, an endless conveyer, a pair of cam strips mounted on said casing in spaced relation to each other and parallel to the path of travel of said conveyer, a series of bottle blank molds associated with said conveyer, a plurality of two part neck molds carried by said conveyer and lying between said cam strips while travelling from the first to the last mold of said series, said neck molds being formed with cam surfaces adapted to cooperate with said cam strips to hold said neck molds closed, said cam strips being discontinuous at a point beyond the last mold of said series to permit opening of said neck molds.

8. In a bottle blank-forming machine, a parison mold, a blow mold, a finishing mold, an endless conveyor belt, a plurality of neck molds carried by said conveyor belt, a neck former with which said neck molds are successively aligned positioned below said parison mold, automatic means for placing one of said neck molds in registry with said parison mold, means for placing said former in position within said neck mold when so in registry, means for admitting compressed air to the molten glass placed in said parison mold, means withdrawing the former from said neck mold, means for conveying the bottle blank from said parison mold to said blow mold, means for closing said molds, means for supplying compressed air to said blow mold, means for opening said molds, means for conveying the bottle blank from said blow mold to said finishing mold and means for releasing said bottle blank from the neck mold to the finishing mold.

9. In a bottle blank-forming machine, a casing, a pair of two-part mold members comprising a parison mold and a blow mold pivoted to the casing, a pair of operating arms pivoted at one end to said mold members, a pair of vertical shafts secured to the other ends of said arms, mold operating arms carried by said shafts, an endless conveyor, a neck mold mounted on said conveyor, said neck mold comprising a two-part hinged mold member, each part being formed with an operating finger extending angularly therefrom.

10. In a bottle blank-forming machine, a standard, a casing mounted on said standard, a plurality of cam disks mounted adjacent said standard, a pair of compressed air reservoirs adjacent said cam disks, a puppet valve in each of said air reservoirs, a valve seat formed in each of said air reservoirs, air pipes leading from said air reservoirs, a pair of two-part mold members constituting a parison mold and a blow mold, a pair of mold operating arms adapted to open and close said mold members, a pair of levers one connected to each operating arm at one end, the other ends of said levers being in engagement with a pair of said cams, an endless conveyor operating between said mold members, a plurality of neck molds carried by said endless conveyor, means associated with said mold operating arms for opening said neck molds and means mounted on said casing for closing said neck molds.

11. In a bottle blank-forming machine, a standard, a casing mounted on said standard, an endless conveyor mounted for movement in said casing, a parison mold and a blow mold mounted in adjacency to said conveyor, a neck mold carried by said conveyor, automatically operating means for opening and closing said parison and said blow molds, means connected to and operated from said mold opening and closing means for opening said neck mold when it reaches a predetermined position relative to said parison and said blow molds, and means mounted on the casing for closing said neck mold when it reaches a predetermined position relative to said parison mold.

12. In a bottle blank-forming machine, an endless conveyor, a parison mold and a blow mold mounted in adjacency to said conveyor, a neck mold carried by said conveyor, automatically operated means for opening and closing said parison and said blow molds, means connected to and operated from said mold opening and closing means for opening said neck mold when it reaches a predetermined position relative to said parison and said blow molds, a vertically movable baffle head for closing the lower part of said blow mold, and vertically reciprocating means for actuating said baffle head.

In testimony whereof I have hereunto set my hand in presence of two subscribing witnesses.

SAMUEL G. STUCKEY.

Witnesses:
ROSE H. DAVIS,
P. ELLELSOEN.